(12) United States Patent
Wong

(10) Patent No.: US 7,571,300 B2
(45) Date of Patent: Aug. 4, 2009

(54) MODULAR DISTRIBUTIVE ARITHMETIC LOGIC UNIT

(75) Inventor: Tak Kwong Wong, Milpitas, CA (US)

(73) Assignee: Integrated Device Technologies, Inc., San Jose, CA (US)

( * ) Notice: Subject to any disclaimer, the term of this patent is extended or adjusted under 35 U.S.C. 154(b) by 389 days.

(21) Appl. No.: 11/621,105

(22) Filed: Jan. 8, 2007

(65) Prior Publication Data

US 2008/0168256 A1 Jul. 10, 2008

(51) Int. Cl.
*G06F 9/30* (2006.01)
(52) U.S. Cl. .............................. 712/1; 712/10; 712/16; 712/200; 712/208
(58) Field of Classification Search ...................... 712/1, 712/10–22, 200, 208–213
See application file for complete search history.

(56) References Cited

U.S. PATENT DOCUMENTS 4,789,957 A * 12/1988 Niehaus et al. ............. 708/518
5,506,992 A * 4/1996 Saxenmeyer ................. 712/11
2001/0054126 A1* 12/2001 Fukuda et al. .............. 710/260
2004/0078548 A1* 4/2004 Claydon et al. ................ 712/1

OTHER PUBLICATIONS

Pavan R. Mula, Modular CMOS ALU Control Unit, Masters Thesis in Electrical Engineering, Texas Tech University, Aug. 1999.*

* cited by examiner

*Primary Examiner*—William M Treat
(74) *Attorney, Agent, or Firm*—Bever Hoffman & Harms

(57) ABSTRACT

A memory system includes a plurality of memory blocks, each having a dedicated local arithmetic logic unit (ALU). A data value having a plurality of bytes is stored such that each of the bytes is stored in a corresponding one of the memory blocks. In a read-modify-write operation, each byte of the data value is read from the corresponding memory block, and is provided to the corresponding ALU. Similarly, each byte of a modify data value is provided to a corresponding ALU on a memory data bus. Each ALU combines the read byte with the modify byte to create a write byte. Because the write bytes are all generated locally within the ALUs, long signal delay paths are avoided. Each ALU also generates two possible carry bits in parallel, and then uses the actual received carry bit to select from the two possible carry bits.

10 Claims, 5 Drawing Sheets

MODULAR DISTRIBUTIVE ARITHMETIC LOGIC UNIT

FIELD OF THE INVENTION

The present invention relates to a memory system that implements a modular and distributed arithmetic logic unit (ALU) to maximize the operating frequency of the system.

RELATED ART

FIG. 1 is a block diagram of a conventional memory system 100, which includes SRAM blocks 101-116, left-side memory bus ML, right-side memory bus MR and dual 64-bit ALU 120. For applications that require a large on-chip memory, the layout of memory system 100 can consume a dominant portion of the entire chip (e.g., >80%). Hence, the connections from ALU 120 to SRAM blocks 101-116 will have various lengths (i.e., from about 0 microns for SRAM blocks 104-105 and 112-113, up to half of the chip's width or length for SRAM blocks 101, 108, 109 and 116). Signals transmitted on the longer connections will exhibit relatively large RC and buffer delay. If an extra cycle cannot be inserted in the signal path, the maximum frequency of memory system 100 will be limited by the signal delay.

One conventional example where an extra cycle cannot be inserted into the signal path is during a read-modify-write operation, where only one cycle is allowed for the modify cycle. The SRAM blocks 101-116 of memory system 100 typically have a synchronous input/output interface. Hence, during one clock cycle, data read from an SRAM block must propagate to ALU 120. During the same clock cycle, ALU 120 must modify the read data. The modified data (i.e., the write data) must then propagate back to the SRAM block during the same clock cycle. Thus, to properly perform a read-modify-write operation, the round-trip data path delay plus the time required for the ALU 120 to calculate the write data from the read data must be less than the period of one clock cycle ($T_{CYCLE}$).

In the example of FIG. 1, each of SRAM blocks 101-116 is a dual-port memory, organized in a 128×8 k array. Each of SRAM blocks 101-116 is capable of performing a read and write operation in one clock cycle. Thus, memory system 100 contains a 16M dual-port QDR burst-of-2 SRAM. ALU 120 supports operations such as AND, OR, XOR, INC, DEC, ADD, SUB and CLR. By placing ALU 120 at the center of SRAM blocks 101-116, the lengths of the signal paths to the furthest SRAM blocks 101, 108, 109 and 116 are minimized. ALU 120 is coupled to receive control/data signals CD, which include clock signals, data input signals, opcode and other control signals required by memory system 100. Excluding the clock signals and the read/write control signals, the left-side memory bus ML and the right side memory bus MR each has a width of 128-Bits (i.e., 64-bits for read data and 64-bits for write data).

SRAM blocks 101-116 provide one operand to ALU 120 (Operand A). ALU 120 also stores the modified data (ALU output) for the two previous cycles (T-1 and T-2). If the memory address associated with an ALU operation to be performed during a current cycle (T) matches the memory address associated with an ALU operation performed during the previous cycle (T-1), then ALU 120 uses the modified data stored during the previous cycle (T-1). Similarly, if the memory address associated with an ALU operation to be performed during a current cycle (T) matches the memory address associated with an ALU operation performed two cycles ago (T-2), then ALU 120 uses the modified data stored two cycles ago (T-2).

If the current address matches the memory address associated with an operation of the previous cycle (T-1), a first match control signal MATCH1 is activated. Similarly, if the current address matches the memory address associated with an operation of two cycles ago (T-2), a second match signal MATCH2 is activated. The MATCH1 signal has priority over the MATCH2 signal, thereby ensuring that the ALU 120 uses the most current data.

The other operand (Operand B) used by ALU 120 can be: (1) a constant derived from the received opcode, (2) a value stored in a default register within ALU 120, or (3) a value provided on the input data bus.

Due the long signal path from ALU 120 to outer SRAM blocks 101, 108, 109 and 116, the round-trip signal delay associated with right-side memory bus MR or left-side memory bus ML becomes a bottleneck for the operating speed of memory system 100. One way to minimize the delay within ALU 120 is to arrange the SRAM blocks 101-116 such that the least significant bits (LSB) of the operand A retrieved from SRAM blocks 101-116 are closet to ALU 120, and the most significant bits (MSB) of the operand A retrieved from SRAM blocks 101-116 are farthest from ALU 120. Because the critical path within ALU 120 is from the LSB input to the MSB output in an addition (ADD) or subtraction (SUB) operation, this arrangement will reduce the timing constraint of a read-modify-write operation. That is, to properly perform a read-modify-write operation, the time required for ALU 120 to calculate the write data from the read data plus the write data path delay must be less than the period of one clock cycle ($T_{CYCLE}$). However, it is not always possible to assign the bit mapping of SRAM blocks 101-116 due to other constraints.

It would therefore be desirable to have a memory system capable of overcoming the timing restraints of prior art memory systems.

SUMMARY

Accordingly, the present invention provides a memory system having a modular and distributed configuration. In one embodiment, a data value having a plurality of data bytes is stored in a plurality of memory blocks, with each of the data bytes being stored in a corresponding one of the memory blocks. Each of the memory blocks also has a corresponding ALU block, wherein each memory block is physically adjacent to its corresponding ALU block. The ALU blocks are coupled to a command decoder by a memory bus.

During a read-modify-write operation, a data value is read from the memory blocks and provided to the ALU blocks, such that each of the ALU blocks receives a corresponding read data byte. Operation instructions, together with data that can serve as a second operand, are provided from the command decoder to the ALU blocks, such that each of the ALU blocks receives a corresponding instruction to modify the read data. Each ALU block combines the associated read and modify instruction to create a write data byte, which is written back to the corresponding memory block. Because the write data bytes are generated locally within the ALU blocks, signal delay on memory bus does not have a significant impact on the total delay of the read-modify-write operation.

Within the ALU blocks, the generation of carry signals is implemented as follows. Each of the ALU blocks receives a carry input signal from an adjacent ALU block. However, rather than waiting for the carry signal to ripple through all of the ALU blocks, the present invention provides for parallel carry signal generation. That is, each ALU generates a first carry signal assuming that the input carry signal will have a logic '0' state, and a second carry signal assuming that the input carry signal will have a logic '1' state. When the input carry signal actually arrives, this signal is used to control a multiplexer, which selects either the first carry signal or the second carry signal as the output carry signal. The carry signal delay for each ALU after the least significant ALU is therefore equal to the delay associated with the multiplexer. This further reduces the total delay of the read-modify-write operation.

The present invention will be more fully understood in view of the following description and drawings.

DETAILED DESCRIPTION

Figure 2:
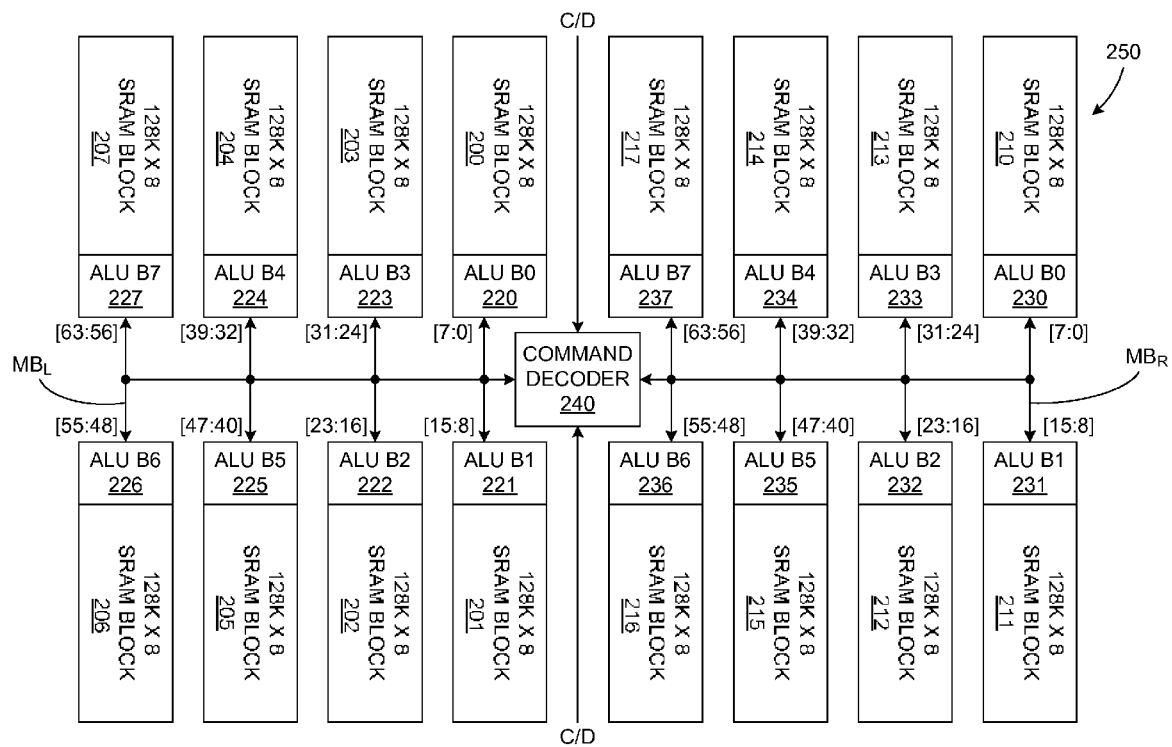
FIG. 2 is a block diagram of a memory system having a modular and distributed configuration in accordance with one embodiment of the present invention.

FIG. 2 is a block diagram of a memory system 250 having a modular and distributed configuration in accordance with one embodiment of the present invention. Memory system 250 includes 128 k×8 memory blocks 200-207 and 210-217, corresponding distributed ALU modules 220-227 and 230-237, command decoder 240, left-side memory bus $MB_L$ and right-side memory bus $MB_R$. Command decoder 240, which is located in the center of memory system 250, is coupled to receive control/data signals C/D, which include clock signals, input data signals, opcode and other control signals required by memory system 250. Command decoder 240 translates the received opcodes and control signals into commands for ALU modules 200-207 and 210-217. Command decoder 240 also directs the received input data signals to the ALU modules in accordance with the corresponding opcode and control signals. ALU modules 220-227 and 230-237 are identical blocks that perform 8-bit arithmetic and logical operations. As described in more detail below, each of these ALU modules contains default registers and multiplexers for providing a pair of operands (i.e., operand A and operand B) to logic within the ALU module.

Excluding the clock signals and the read/write control signals, the left-side memory bus $MB_L$ and the right side memory bus $MB_R$ each has a width of 64-Bits. A 64-bit data word D[63:0] is transferred on memory buses $MB_L$ and $MB_R$. The 64-bit data word D[63:0] includes eight 8-bit bytes: D[7:0] (byte B0), D[15:8] (byte B1), D[23:16] (byte B2), D[31:24] (byte B3), D[39:32] (byte B4), D[47:40] (byte B5), D[55:48] (byte B6), D[63:56] (byte B7). In the described embodiments, byte B0 is the least significant byte and byte B7 is the most significant byte.

The bytes B0-B7 of each 64-bit word are assigned to the ALU modules 220-227, 230-237 (and the associated memory blocks 200-207, 210-217) such that the ALU modules that process adjacent bytes are physically next to one another. For example, ALU modules 220-227 are assigned to process bytes B0-B7, respectively, on the left-side memory bus $MB_L$. Similarly, ALU modules 210-217 are assigned to process bytes B0-B7, respectively, on the right-side memory bus $MB_R$. The ALU byte assignments illustrated in FIG. 2 illustrates two possible ways to achieve minimum wire delay. In another embodiment, the ALU byte assignments on the right-side memory bus $MB_R$ are a mirror image of the ALU byte assignments on the left-side memory bus $MB_L$.

Figure 3:
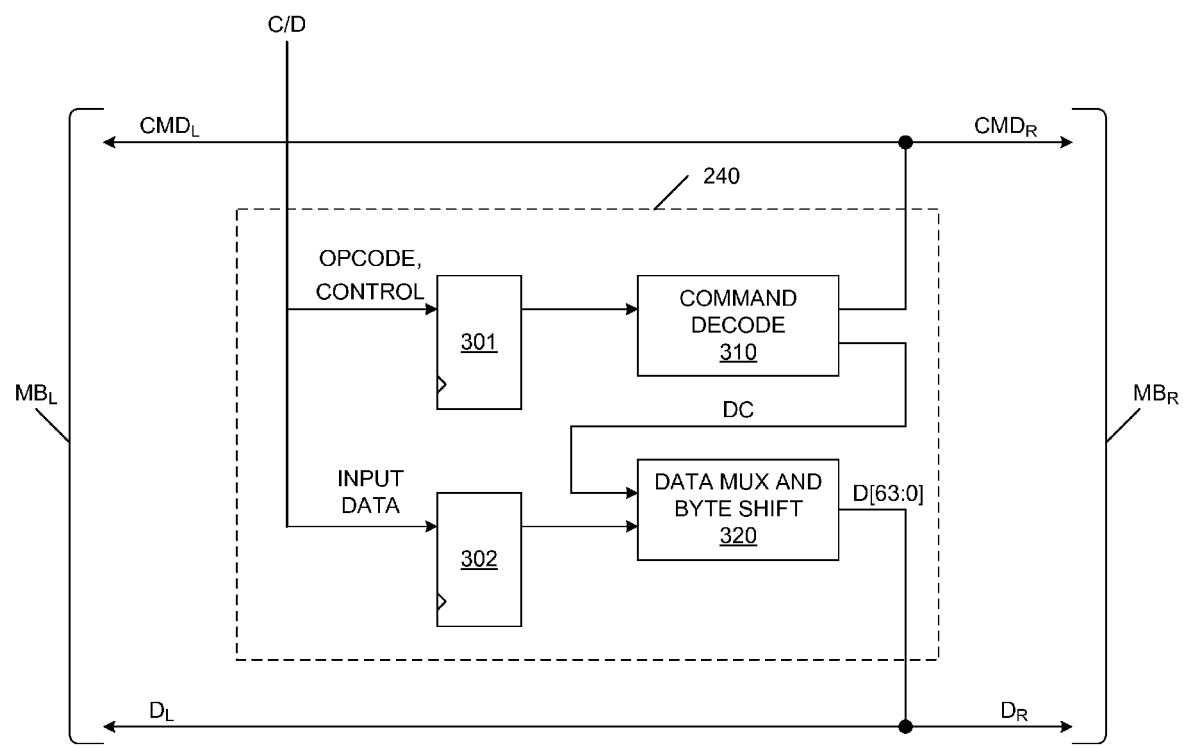
FIG. 3 is a block diagram of a command decoder in accordance with one embodiment of the present invention.

FIG. 3 is a block diagram of command decoder 240 in accordance with one embodiment of the present invention. Command decoder 240 includes control register 301, data register 302, command decode circuit 310 and data multiplexer/byte shifter 320. Opcode and control signals are synchronously latched into control register 301, and input data signals are synchronously latched into data register 302. The opcode and control signals stored in control register 301 are provided to command decode circuit 310. The control signals can include, for example, an address of a default register within the ALU modules, an ALU enable signal, or match signals.

In response, command decode circuit 310 generates a corresponding command, which is provided on left-side command bus $CMD_L$ and right-side command bus $CMD_R$. The command provided on left-side command bus $CMD_L$ and right-side command bus $CMD_R$ is used to control ALU modules 220-227 and 230-237. These commands can include, for example, operand select signals, write enable signals for the default registers in the ALU modules and ALU commands, such as exclusive OR (XOR), addition (ADD), subtraction (SUB) and clear (CLR).

Data multiplexer/byte shifter 320 is configured to receive the input data value stored in data register 301, and a data control signal DC. Command decode circuit 310 generates the data control signal DC, which indicates the manner in which the input data value is to be modified (if at all). Data multiplexer/byte shifter 320 routes the received input data value in response to the data control signal DC. The data value D[63:0] routed by data multiplexer/byte shifter 320 is provided on the left-side data bus $D_L$ and the right-side data bus $D_R$. The left-side data bus $D_L$ and the left-side command bus $CMD_L$ form the left-side memory bus $MB_L$. Similarly, the right-side data bus $D_R$ and the right-side command bus $CMD_R$ form the right-side memory bus $MB_R$. The left-side data bus $D_L$ routes the data value D[63:0] to/from ALU modules 220-227, and the right-side data bus $D_R$ routes the data value D[63:0] to/from ALU modules 230-237. Depending on the corresponding command, the data on buses $D_L$ and $D_R$ can be stored in default registers within the ALU modules, or used as an operand (OP_B) within the ALU modules.

Figure 4:
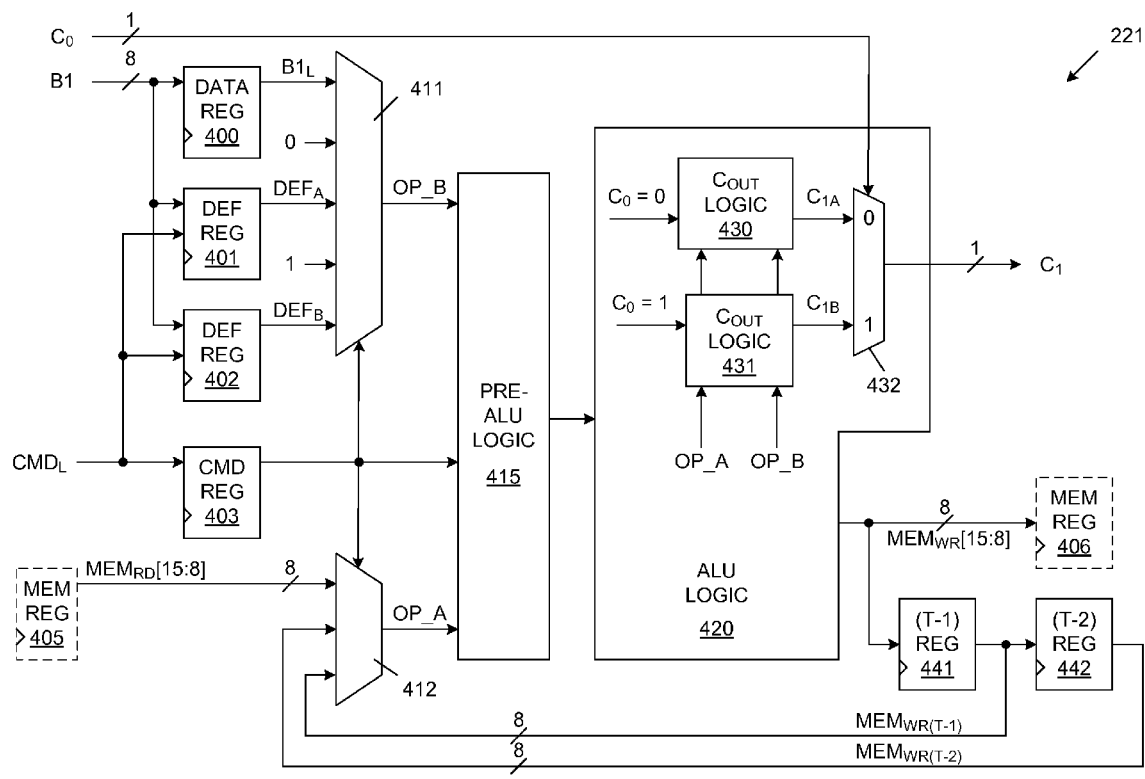
FIG. 4 is a block diagram of an 8-bit ALU module in accordance with one embodiment of the present invention.

FIG. 4 is a block diagram of 8-bit ALU module 221 in accordance with one embodiment of the present invention. ALU module 221 includes data register 400, default registers 401-402, command register 403, multiplexers 411-412, pre-ALU logic 415, ALU logic 420, and previous cycle registers 441-442. ALU logic 420 includes a pair of carry output logic circuits 430-431, and a carry output multiplexer 432. Unless otherwise noted below, ALU modules 220, 222-227 and 230-237 are identical to ALU module 221.

Data register 400 and default registers 401-402 are coupled to receive byte B1 (i.e., 8-bit data value D[15:8]) from left-side data bus $D_L$. Command register 403 and default registers 401-402 are coupled to receive command signals from left-side command bus $CMD_L$. Byte B1 on left-side data bus $D_L$ is latched into data register 400 in response to a memory system clock signal (not shown). The byte B1 on left-side data bus $D_L$ can also be latched into default register 401 and/or default register 402 in response to the memory system clock signal, provided that these registers are enabled by the command value on command bus $CMD_L$. The values latched into registers 400, 401 and 402 are labeled $B1_L$, $DEF_A$ and $DEF_B$, respectively. In addition, the corresponding command value provided on command bus $CMD_L$ is latched into command register 403 in response to the memory system clock signal.

Registers 400, 401 and 402 provide potential operand values $B1_L$, $DEF_A$ and $DEF_B$, respectively, to inputs of multiplexer 411. Multiplexer 411 is also configured to receive an 8-bit logic '0' input value and an 8-bit logic '1' input value. Multiplexer 411 routes one of these input values as operand B (OP_B) in response to the command value stored in command register 403.

The 8-bit data byte $MEM_{RD}[15:8]$ that is read from corresponding memory block 201 (and stored in memory register 405 within the memory block 201) is provided to an input of multiplexer 412. Multiplexer 412 is also configured to receive a pair of 8-bit data bytes ($MEM_{WR(T-1)}$ and $MEM_{WR(T-2)}$) associated with the two previous write operations implemented by ALU 221. Multiplexer 412 routes one of these received data bytes as operand A (OP_A) in response to the command value stored in command register 403.

The command signals stored in command register 403 and the operands OP_A and OP_B are provided to pre-ALU logic 415. Pre-ALU logic 415, which is described in more detail below, includes logic that would typically be included in ALU logic 420. Pre-ALU logic 415 is coupled to ALU logic 420, such that the command value and operands OP_A and OP_B are provided to ALU logic 420. Pre-ALU logic 415 and ALU logic 420 are used to perform the desired arithmetic and logical operations.

ALU logic 420 is also coupled to receive a carry bit $C_0$ from the lower-adjacent ALU module 220. As used herein, a lower-adjacent ALU module is defined as a physically adjacent ALU module that processes the byte of next least significance. For example, in FIG. 2, ALU module 224 is a lower-adjacent ALU module with respect to ALU module 225, and ALU 221 is a lower-adjacent ALU module with respect to ALU module 222. Each of ALU modules 221-227 receives a corresponding carry bit $C_0$-$C_6$ from its associated lower-adjacent ALU module. The carry bits $C_0$-$C_6$ are generated by the ALU logic blocks in ALU modules 220-226, respectively. (Note that ALU module 220 does not have a lower-adjacent ALU module, and therefore does not receive a carry bit.) The carry bit is well known in binary addition and subtraction operations.

In a conventional ALU, the carry bit must sequentially propagate (ripple) through each bit of the operation before being provided at an output of the ALU. For example, in the 64-bit ALU 150 of FIG. 1, a carry bit would have to sequentially propagate through a 64-bit operation in order to create a final result. Hence, carry bit delay dominates the critical path delay. The ALU design of the present invention speeds up this path to achieve high speed performance. As described in more detail below, ALU modules 220-227 and 230-237 calculate the carry bits largely in parallel, thereby significantly reducing the timing requirements of memory system 250.

Within ALU logic 420, operands OP_A and OP_B are applied to carry output logic blocks 430 and 431. Carry output logic block 430 calculates a carry bit $C_{1A}$, using the assumption that the received carry bit $C_0$ has a logic '0' value. Similarly, carry output logic block 431 calculates a carry bit $C_{1B}$, using the assumption that the received carry bit $C_0$ has a logic '1' value. By the time that the lower-adjacent ALU module 220 actually provides the valid carry bit $C_0$, the calculated carry bits $C_{1A}$ and $C_{1B}$ are valid. Carry bit $C_0$ controls multiplexer 432, such that the correct carry bit is quickly provided as the output carry bit $C_1$. That is, multiplexer 432 routes carry bit $C_{1A}$ as carry bit $C_1$ if the received carry bit $C_0$ has a logic '0' state. Conversely, multiplexer 432 routes carry bit $C_{1B}$ as carry bit $C_1$ if the received carry bit $C_0$ has a logic '1' state. Consequently, the delay path does not include the rippling of carry bit $C_0$ through 8 bits of operands to create carry bit $C_1$. That is, ALU module 221 only introduces a delay associated with 2-to-1 multiplexer 432.

Conceptually, two 8-bit ALUs operate in parallel within ALU module 221. However, the actual implementation only duplicates the logic required to generate the output carry signal $C_1$. That is, the logic required to provide the ALU output $MEM_{WR}[15:8]$ is not duplicated. Hence, the increase in logic is minimal within ALU module 221.

Within ALU logic 420, operands OP_A and OP_B and the associated command are used to generate the ALU output $MEM_{WR}[15:8]$. This ALU output $MEM_{WR}[15:8]$ is stored in write memory register 406, which is located in the associated memory block 201.

Each of ALU modules 222-227 operate in the same manner as ALU module 221, such that a pair of output carry signals has been generated within each of these modules by the time the associated input carry signal becomes valid.

Memory system 250 performs a read-modify-write operation in the following manner. The read-modify-write opcode, control signals and write value are initially provided to the memory access controller (not shown) and command decoder 240. At this time, the memory access controller begins a read access to the address associated with the read-modify write command. The memory architecture can be defined so that all SRAM blocks 200-207 and 210-217 are accessed together (e.g., using a 17-bit address). In this configuration, all ALU modules 220-227 and 230-237 operate together to perform a dual 64-bit operation. The left side 64-bit ALU modules 220-227 and the right side 64-bit ALU modules 230-237 can perform totally independent operations, as C/D signals can be decoded as different commands $CMD_L$ and $CMD_R$. For example, the left side ALU can be performing an ADD operation while the right side ALU is performing an XOR operation.

Alternately, the memory architecture can be defined so that only the left side or the right side SRAM blocks are accessed together (e.g., using an 18-bit address, with the extra address bit selecting either the left side SRAM blocks 200-207 or the right SRAM blocks 210-217). In this configuration, assuming a received address is associated with memory blocks 200-207, a read data value $MEM_{RD}[63:0]$ is read out of memory blocks 200-207, while memory blocks 210-217 remain idle. The read data value $MEM_{RD}[63:0]$ is latched into read data registers within memory blocks 200-207, and provided to local ALU modules 220-227 as eight 8-bit bytes.

While the read operation is performed on memory blocks 200-207, command decoder 240 provides the write value (bytes B0-B7) on data buses $D_L$ and $D_R$, and provides the read-modify-write command on command buses $CMD_L$ and $CMD_R$. Bytes B0-B7 of the write value are latched into the data registers within ALU modules 220-227 (e.g., Byte B1 is latched into data register 400 of ALU module 221). In addition, the read-modify-write command is latched into the command registers within ALU modules 220-227 (e.g., into command register 403 of ALU module 221). The read-modify-write command causes multiplexers within ALU modules 220-227 to route the write data value B0-B7 and the read data value $MEM_{RD}[63:0]$ to ALU logic within the associated ALU module. For example, within ALU module 221, multiplexers 411 and 412 route the latched write data byte $B1_L$ and the read data byte $MEM_{RD}[15:8]$ to ALU logic 420 as operands OP_B and OP_A, respectively.

The ALU logic within each of ALU modules 220-227 creates a modified write data value $MEM_{WR}[63:0]$ in response to the write data value B0-B7 and the read data value $MEM_{RD}[63:0]$ The delay introduced within ALU modules 220-227 is equal to the time required for ALU module 220 to generate the carry bit $C_0$ plus the propagation delay through the six 2-to-1 multiplexers in ALU modules 221-226 (e.g., 2-to-1 multiplexer 432) plus the time required for ALU module 227 to generate $MEM_{WR}[63:56]$ based on the carry bit $C_0$ provided from ALU module 226. The total delay of the read-modify-write operation is therefore equal to the time required to read $MEM_{RD}[63:0]$ from memory blocks 200-207, plus the delay introduced within ALU modules 220 227, plus the time required to write the modified data $MEM_{WR}[63:0]$ back to memory blocks 200-207. This is a significant improvement over prior art memory system 100, thereby enabling memory system 250 to operate at a higher frequency.

Note that there are three sets of registers between the control/data signals and memory blocks 200-207, 210-217.

In the memory path, a first set of registers (not shown) clocks the address and control signals for the memory read operation, a second set of registers (e.g., memory register 405) clocks the read data $MEM_{RD}[63:0]$ read from the memory blocks, and a third set of registers (e.g., write register 406) clocks the modified data $MEM_{WR}[63:0]$ to be written back to the memory blocks.

In the ALU path, a first set of registers 301-302 clock the opcode, control signals and data input signals in command decoder 240, a second set of registers, which includes registers 400-403, clock the command and data signals $D_L[63:0]$, $D_R[63:0]$, $CMD_L$ and $CMD_R$ in ALU modules 200-207 and 210-217, and a third set of registers (e.g., write register 406) clock the modified data $MEM_{WR}[63:0]$ to be written back to the memory (i.e., the same registers as the memory path).

In accordance with one embodiment, the modified data values $MEM_{WR}[63:0]$ associated with the two previous operations are stored in previous cycle registers 441 and 442. The modified data values stored in previous cycle registers 441 and 442 can be accessed (via the commands stored in ALU modules 220-227) in the case of back-to-back operations. This ensures that the most recent data values are used within memory system 250.

Figure 1:
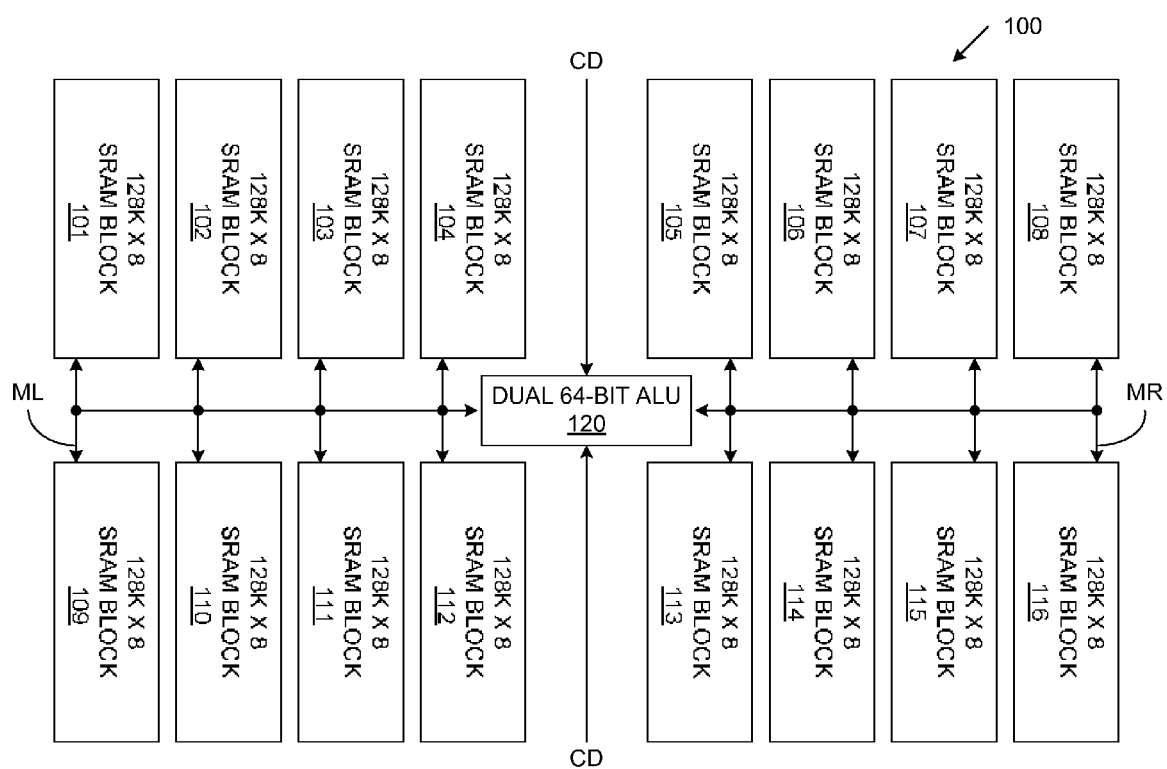
FIG. 1 is a block diagram of a conventional memory system.

Advantageously, the distributive and modular approach of the present invention increases the frequency of operation by eliminating the round trip delay between the memory modules and the ALU (see, FIG. 1). The wire delay of the $MEM_{RD}$ and $MEM_{WR}$ values in the present invention is negligible, as ALU modules 220-227 and 230-237 are right next to the corresponding memory modules 200-207 and 210-217.

Moreover, The only critical path in memory system 250 involves only one signal (i.e., a single carry bit), rather than many signals (e.g., $MEM_{RD}[63:0]$ and $MEM_{WR}[63:0]$traversing the long data buses of FIG. 1). Hence, the operating frequency can be higher. In addition, less effort is required to optimize and reach timing goals.

The distributive architecture of the present invention also reduces the memory bus width. That is, memory buses $MB_L$ and $MB_R$ are smaller than memory buses ML and MR. Typically, the command bus is much less than 64 bits wide. The data output bus can be half that of $MEM_{RD}$ if Operand B for the 64-bit ALU is only 32-bits wide. That is, both $D_L$ and $D_R$ are 32-bits wide, and are sent to ALU modules 220-223 and ALU modules 230-233, respectively. In this case, operand B (OP_B) for ALU modules 224-227 and 234-237 is selected from other sources (e.g., $DEF_A$, $DEF_B$, 0 or 1), in response to signals on the command bus. The different behavior among ALU modules can be achieved by adding an extra bit to the command bus to program the ALU modules to function in the upper or lower 32-bits. The different behavior can alternatively be hard programmed into a command translator inside the ALU modules (as in combinational logic 503 of FIG. 5).

Furthermore, the generic and modular nature of ALU modules 220-227 and 230-237 minimize the required development effort, because the same ALU module is used 16 times. This also enables design reuse. Moreover, any change in top level ALU functions can be accomplished by changing only the command decode logic 310.

Figure 5:
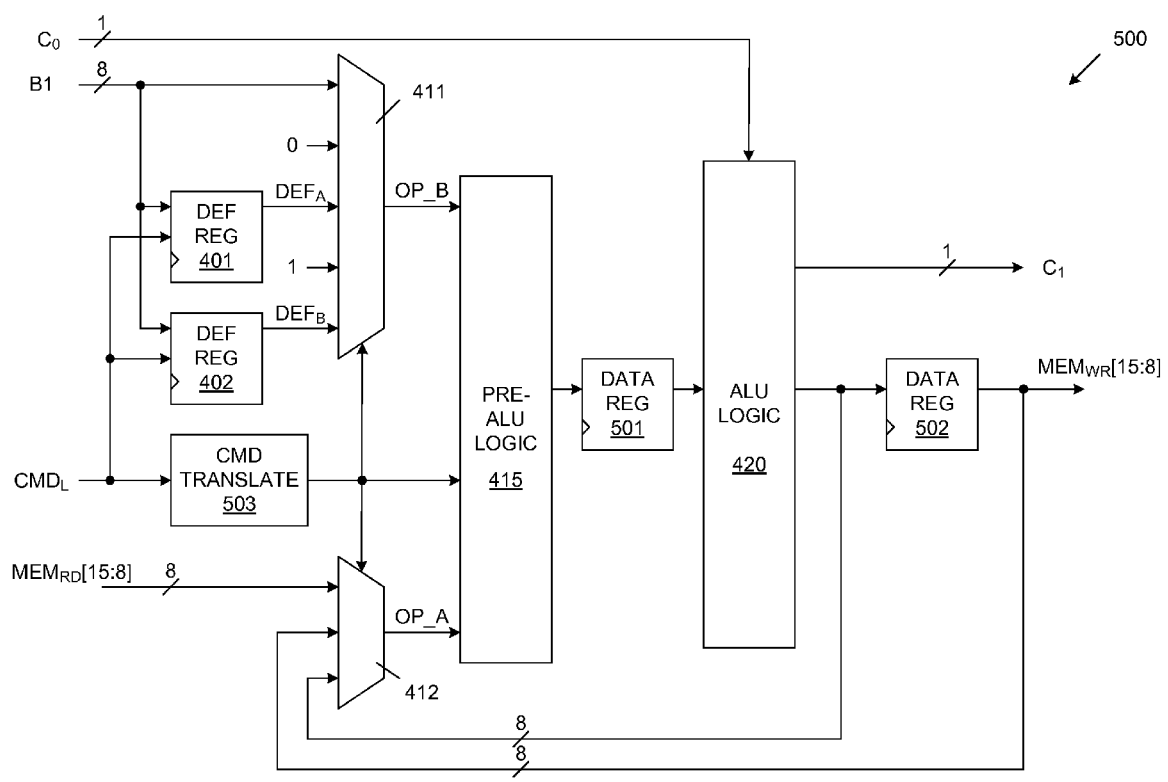
FIG. 5 is a block diagram of an 8-bit ALU module in accordance with an alternate embodiment of the present invention.

In accordance with one embodiment, the clock signal applied to the individual memory blocks and ALU modules are aligned (e.g., with clock tree synthesis in place and route). Typically, the root of the clock tree is at the center of the chip. In one embodiment, the setup time of the control/data signals C/D is small enough to allow the fastest version of the clock signal to be used by command decoder 240. In the architecture of FIG. 5, the clock to $MB_L$ delay to data register 501 delay can be more than $T_{CYCLE}$, which enables an even higher frequency of operation.

In accordance with another embodiment, the clock signals are not aligned. The clock signals provided to ALU modules 220-227 and 230-237 will gradually have more delay as the distance from the center of the chip increases. That is, the RC delay introduced to the clock signal increases as this signal travels away from the chip center. When using the byte arrangement illustrated on the left side of FIG. 2, the frequency of operation can even go higher due to the fact that the ALU operation has more than one cycle of the clock signal to finish. The gain in timing margin is equal to the clock delay difference from the center of the chip to the edge of the chip. The general idea is to add enough clock delay to meet the input setup time requirement of the carry signals.

In addition to the delay introduced by the clock tree, clock delay can be added deliberately at any of the following locations: (a) between ALU modules 220-221 and ALU modules 222-223; (b) between ALU modules 222-223 and ALU modules 224-225; (c) between ALU modules 224-225 and ALU modules 226-227.

The upper bound of the delay is limited by the hold time of input signals to each ALU module. Another constraint on the introduced delay is whether the corresponding memory block can operate properly in view of the introduced delay (because the clock input to an ALU module and the corresponding memory block should be the same).

The modular architecture of the present invention also enables different ALU module configurations to be implemented with minimal change. For example, a 64-bit ALU can be configured as either a single 64-bit ALU or two 32-bit ALUs.

To implement two 32-bit ALUs, the carry bit C3 provided from ALU module 223 to ALU module 224 is set to a logic '0' value (such that there is effectively no carry bit transmitted to ALU module 224). This can be accomplished by making the carry signal provided to ALU module 224 equal to the logical AND of the carry bit C3 and a mode signal (MODE64), and then setting this mode signal to '0'. In this case, ALU modules 220-223 form one 32-bit ALU, and ALU modules 224-227 form a second 32-bit ALU. In this embodiment, the command decoder 240 can send out two sets of commands to the 32-bit ALUs. In the 64-bit ALU mode, the mode signal MODE64 is set to '1', and both sets of commands are made identical. In an alternate embodiment, one set of commands is sent, and a small command translate block is added in the ALU modules 224-227 to interpret these commands differently, based on the state of the mode signal MODE64. In this case, there are two versions of ALU modules with minor variations. Other configurations with up to 8-bit granularity are possible.

Because each ALU module is physically located immediately next to the associated memory block, the data input and output registers can be removed from the memory blocks and implemented inside the ALU modules instead. FIG. 5 is a block diagram that illustrates an ALU module 500 in accordance with such an embodiment. Because ALU module 500 is similar to ALU module 221, similar elements in FIGS. 5 and 4 are labeled with similar reference numbers. ALU module 500 replaces data register 400, command register 403 and memory read register 404 (which are typically located in the associated memory block) with register 501. ALU module 500 also replaces memory write register 405 (which is typically located in the associated memory block) and the previous cycle registers 441-442 with register 502. Advantageously, the required number of registers is significantly reduced.

The register-to-register delay from the command decoder 240 to each ALU module is typically less than Tcycle. Thus, part of the ALU logic can be shifted to the previous pipe (i.e., pre-ALU logic 415). The maximum frequency of ALU operation is thereby further increased.

Although the present invention has been described in connection with several embodiments, it is understood that this invention is not limited to the embodiments disclosed, but is capable of various modifications which would be apparent to one of ordinary skill in the art. Thus, the invention is limited only by the following claims.

I claim:

1. A memory system comprising:
   a first set of memory blocks, each configured to store a byte of a data value;
   a first set of arithmetic logic units (ALUs), each coupled to a corresponding one of the memory blocks in the first set of memory blocks;
   a command decoder configured to receive control and data signals; and
   a first data bus coupling each of the ALUs in the first set of ALUs to the command decoder, wherein the first data bus has a width equal to the width of one byte between each of the ALUs in the first set of ALUs and the command decoder.

2. The memory system of claim 1, further comprising:
   a second set of memory blocks, each configured to store a byte of a data value;
   a second set of arithmetic logic units (ALUs), each coupled to a corresponding one of the memory blocks in the second set of memory blocks; and
   a second data bus coupling each of the ALUs in the second set of ALUs to the command decoder, wherein the second data bus has a width equal to the width of one byte between each of the ALUs in the second set of ALUs and the command decoder.

3. The memory system of claim 1, wherein the command decoder comprises:
   a first register for synchronously latching received control signals;
   a command decode circuit configured to generate a command and a data control circuit in response to control signals latched in the first register;
   a second register for synchronously latching received data signals; and
   a data multiplexer and byte shifter configured to modify and route data signals latched in the second register to the first data bus in response to the data control signal.

4. The memory system of claim 1, wherein each of the ALUs in the first set of ALUs comprises:
   a first multiplexer configured to pass a write data byte from the first data bus as a first operand in response to a read-modify-write command;
   a second multiplexer configured to pass a read data value from the corresponding memory block as a second operand in response to the read-modify-write command; and
   a logic circuit configured to receive the first operand, the second operand, the read-modify-write command and an input carry signal generated in a lower-adjacent ALU.

5. The memory system of claim 4, wherein each logic circuit comprises:
   a first carry output logic circuit configured to generate a first output carry signal assuming that the input carry signal has a first logic state;
   a second carry output logic circuit configured to generate a second output carry signal assuming that the input carry signal has a second logic state; and
   a multiplexer configured to route the first output carry signal to an adjacent ALU if the input carry signal has the first logic state, and further configured to route the second output carry signal to the adjacent ALU if the input carry signal has the second logic state.

6. The memory system of claim 4, wherein each of the ALUs in the first set of ALUs further comprises a first default register configured to provide a first default operand to the first multiplexer.

7. The memory system of claim 4, wherein each of the ALUs in the first set of ALUs further comprises a command register configured to synchronously latch commands provided by the command decoder.

8. The memory system of claim 4, wherein each logic circuit comprises a write byte bus coupling the logic circuit to a write port of the corresponding memory block.

9. The memory system of claim 8, wherein each logic circuit comprises a previous cycle register configured to synchronously latch data on the write byte bus.

10. The memory system of claim 9, wherein an output of the previous cycle register is coupled to an input of the second multiplexer.

* * * * *